July 12, 1938. E. L. HELWIG 2,123,552
APPARATUS FOR SHAPING THERMOPLASTIC SHEETS
Filed Nov. 19, 1936

Inventor.
Edward L. Helwig,
By John F. Bergin
Attorney.

Patented July 12, 1938

2,123,552

UNITED STATES PATENT OFFICE 2,123,552

APPARATUS FOR SHAPING THERMOPLASTIC SHEETS

Edward L. Helwig, Bristol, Pa., assignor to Rohm & Haas Company, Philadelphia, Pa.

Application November 19, 1936, Serial No. 111,650

2 Claims. (Cl. 18—56)

This invention relates to a method and apparatus for shaping transparent organic thermoplastic sheet material into objects having three-dimensional curved surfaces. More particularly it relates to a process and apparatus whereby this can be accomplished without marring the original surface finish of the sheet material.

When transparent organic sheet material is used as a substitute for glass in such places as in windows or cockpit covers for aircraft, it is necessary that the surface be as highly polished and as smooth as that of plate glass. Otherwise, vision will be distorted and the proper control of the aircraft endangered. To place the necessary high polish on curved sheets of the thermoplastic sheet material after it is shaped, is extremely difficult and expensive. For this reason common practice has been to produce the surface finish before shaping the sheet material.

The shaping has heretofore usually been accomplished by clamping the sheet across the opening of a negative mold, warming it to the softening point, and then pressing it against a positive mold to stretch the sheet to the desired shape. The pressure needed to stretch the sheet is considerable and must be transmitted from the positive mold to the sheet. The positive mold and sheet are consequently in very intimate contact and since the plastic sheet is near its softening point, the surface of the positive mold is impressed upon the plastic material. It is necessary, therefore, to have a highly polished and consequently very expensive positive mold, as otherwise, the surface of the sheet will be roughened and marred by the mold surface.

Practically all of the surface marring is caused by the positive mold pressing against the inner side of the sheet as considerable pressure is required at this point. The outer surface is practically perfect as very little pressure is required to guide the material into the negative mold.

In this invention the positive mold is replaced by a fluid operating under such pressure that it uniformly and gently stretches the sheet to the shape of the negative mold without, however, pressing it firmly thereagainst. In effect the negative mold serves merely to guide the sheet into the desired shape and to prevent it from stretching too far. No hard surface is pressed against the sheet and in consequence the shaped object retains the surface finish of original sheet.

It has been known that thermoplastic sheet material can be shaped by blowing operations, wherein a heated fluid forces the sheet into a mold and many patents have appeared utilizing this method of making such objects as balls, tumblers, inner tubes, etc. In all such processes however, the object has been to transfer the mold texture to the surface of the thermoplastic material. In the present invention such a result would be highly undesirable and therefore, means are provided to prevent the plastic material from being firmly pressed against the mold.

In general, this is accomplished by securing the sheet material to a pressure chamber which so coacts with the mold that as soon as the thermoplastic sheet fills the mold and before it is pressed firmly against the mold surface, the mold moves away from the pressure chamber, whereupon the pressure is discontinued either by an operator or by automatic mechanism provided for the purpose.

For the further description of the process, reference is made to the accompanying drawing in which two pieces of apparatus adapted for carrying out the process are disclosed.

Figure 1:
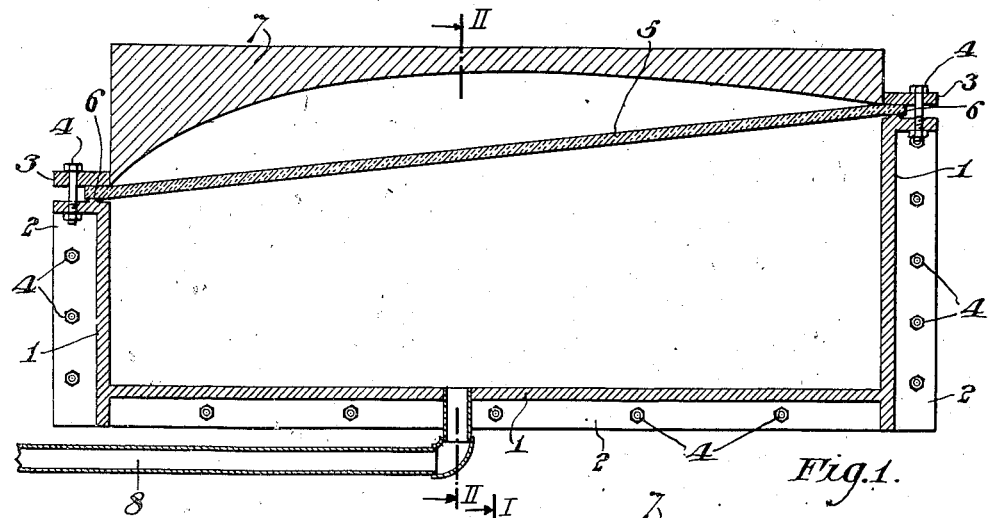
Figure 1 is a longitudinal section, taken along line I—I, Figure 2, of an assembly suitable for forming an airplane cockpit cover by blowing with an inert gas, showing the sheet of thermoplastic material in position prior to blowing.
Figure 2:
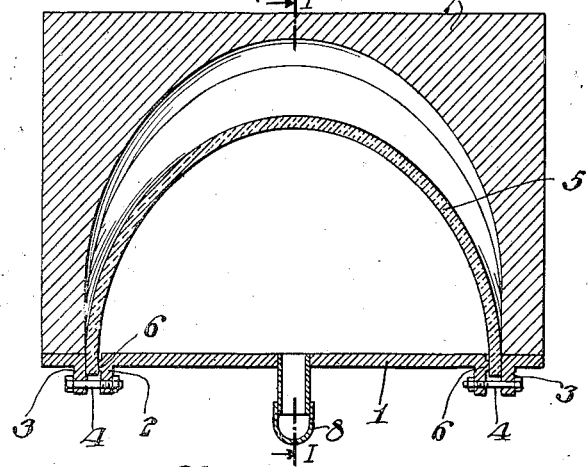
Figure 2 is a section of the same assembly taken along line II—II, Figure 1.

Referring particularly to Figures 1 and 2, numeral 1 indicates the walls of the pressure chamber around which a flange 2 is provided to receive the sheet of thermoplastic material 5. A retainer 3, adapted to be secured to flange 2 by clamping means, such as bolts 4, serves to hold the sheet of thermoplastic material indicated at 5 securely against projection 6 on flange 2, whereby an airtight seal is produced. Numeral 7 indicates the mold which lies over thermoplastic sheet 5 and rests upon retainer 3. A pipe line 8 connecting with the bottom of the chamber provides a means for introducing a fluid under pressure into the pressure chamber.

In the operation of the apparatus the sheet of thermoplastic material is clamped in place by the means shown, the mold set above the sheet, and the whole assembly placed in an oven where it is heated to the temperature at which the thermoplastic material begins to soften. Preferably a low gas pressure, such as 1 to 2 pounds per square inch, is applied to the under side of the sheet during the heating period to prevent its sagging. When the desired temperature is reached the pressure is raised to from 10 to 20 pounds per square inch, depending upon the material being treated, its thickness and the degree to which it has been softened, whereupon it is stretched and made to conform to the inner surface of the mold. Further stretching begins to raise the mold off the pressure chamber. When this occurs the supply of pressure is cut off and the assembly removed from the oven and allowed to cool.

Figure 3:
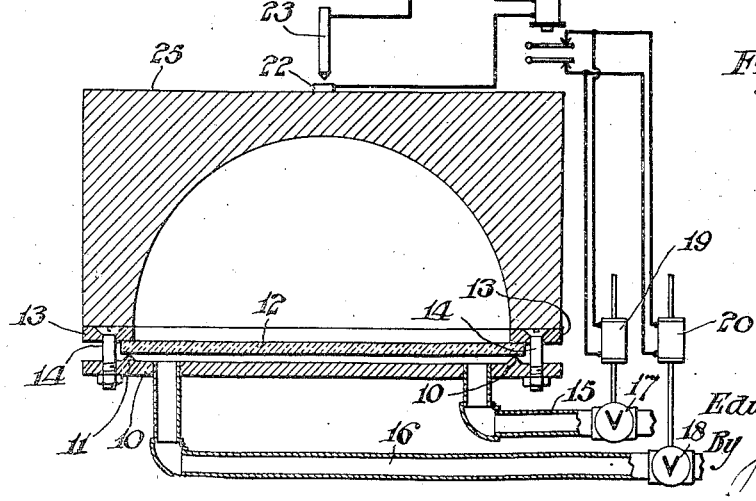
Figure 3 is a cross-section of an assembly adapted for blowing hemispheres by means of liquid pressure, showing the sheet of thermoplastic material in position prior to blowing; and also showing schematically an automatic apparatus for releasing pressure when the sheet has reached the desired shape.

In the assembly shown in Figure 3, the pressure chamber consists of a base plate 10 having near its outer edge a circular projection 11 upon which a sheet of thermoplastic material 12 rests. Retaining ring 13 by means of bolts 14 clamps the thermoplastic sheet 12 in place and produces an airtight seal at the projection 11. The mold 25 rests on the retaining ring 13. Numerals 15 and 16 indicate pipe connections for transmitting fluid under pressure to and from the pressure chamber. Valves 17 and 18 in connections 15 and 16 respectively, and operated by the solenoids 19 and 20 respectively, serve to control the pressure fluid circulating through the pressure chamber and to discontinue its circulation when the thermoplastic sheet has been blown to the desired shape. Solenoids 19 and 20 are operated by a relay 21 which in turn is activated when the contact point 22 carried by mold 25 is raised and with contact point 23 closes the circuit through the battery or other source of power indicated at 24.

In the operation of this assembly, the sheet of thermoplastic material is clamped in position by retaining ring 13, mold 25 is set in place, and valves 17 and 18 opened to permit circulation of a heated fluid under pressure through the space between the base plate 10 and thermoplastic sheet 12. The sheet of thermoplastic material as it softens through the action of the heated fluid, is stretched to conform to the interior of the mold. After it has filled the mold, further stretching raises the mold off retaining ring 13, thereby bringing point 22 in contact with point 23 and closing the circuit through relay 21 which, in turn, operates solenoids 19 and 20 to close valves 17 and 18, thereby discontinuing the application of pressure.

The illustrated apparatus is applicable to all types of organic thermoplastic sheet material, such as cellulose derivatives, polymers and interpolymers of acrylic and methacrylic derivatives, particularly the esters, vinyl esters and other polymeric materials such as polymeric styrene, etc. that form rigid polymers. In order to illustrate the operation of the apparatus the following examples are given. It should be understood that these examples are given for purposes of illustration only and should not be construed as a limitation on the invention.

*Example 1.*—A sheet of polymethyl methacrylate is slightly heated and bent to conform to the flange 2 of the assembly illustrated in Figures 1 and 2. It is set in place and retainer 3 clamped tightly by means of bolts 4. The whole assembly is placed in an oven and heated to 95–100° C. while nitrogen gas is introduced through pipe 8 to maintain a pressure of 1 to 2 pounds per square inch. When the sheet of polymethyl methacrylate reaches its softening point, the mold 7 is set in place and the nitrogen pressure increased to 10 pounds per square inch. In a few seconds the mold is lifted slowly from the retaining ring on which it rests. Pressure is immediately discontinued and the assembly removed from the oven and allowed to cool.

*Example 2.*—In the same manner a sheet of cellulose acetate 1/8" thick was shaped into a cockpit cover by heating it to a softening temperature at 125° C. and blowing with from 10 to 15 pounds per square inch pressure.

*Example 3.*—A flat disc of polymethyl methacrylate was clamped in the assembly illustrated in Figure 3 and water heated to 95° C. and under a pressure of 15 to 20 pounds per square inch, circulated through the pressure chamber. After the sheet had stretched to the contour of the mold, and the circulation of the heated fluid automatically discontinued, valves 17 and 18 were again opened and cool water at atmospheric pressure was circulated through pipes 15 and 16 to cool the plastic to below its softening point.

In the apparatus as illustrated, the molds are held in place by their own weight and the amount of pressure needed to raise them from the pressure chambers therefore depends upon their size and the material from which they are made. Since the sheet material is not pressed firmly against the mold it is unnecessary to have its interior surface highly polished and a mold made from well-seasoned hardwood can be used. Other materials, such as metals, glass, etc. may also be used. In some instances it may be desirable to line the mold with a soft material such as felt. Instead of relying solely on the weight of the mold to hold it against the pressure chamber, other means, such as springs, additional weights, etc. can be used either in place of or in conjunction with the weight of the mold.

I claim:

1. Apparatus for shaping organic thermoplastic sheet material which comprises in combination a pressure chamber having an opening adapted to receive a sheet of organic thermoplastic material, means for clamping said sheet across the opening of said chamber, means for admitting a fluid under pressure to said chamber, a mold adapted to coact with the opening in said chamber and to be moved away therefrom by the sheet material being pressed against it at a pressure that is insufficient to transfer the texture of the mold surface to the thermoplastic sheet.

2. Apparatus for shaping organic thermoplastic sheet material which comprises in combination a pressure chamber having an opening adapted to receive a sheet of organic thermoplastic material, means for clamping said sheet across the opening of said chamber, means for admitting a fluid under pressure to said chamber, a mold adapted to coact with the opening in said chamber and to be moved away therefrom by the sheet material being pressed against it at a pressure that is insufficient to transfer the texture of the mold surface to the thermoplastic sheet, and automatic means for discontinuing the application of pressure when said mold leaves its seat.

EDWARD L. HELWIG.